(12) United States Patent
Jin

(10) Patent No.: US 9,840,988 B2
(45) Date of Patent: Dec. 12, 2017

(54) SEPARATION CHAMBER TYPE ANTI-SURGE VALVE AND COMMERCIAL VEHICLE TURBOCHARGER SYSTEM APPLYING THE SAME

(71) Applicant: Hyundai Motor Company, Seoul (KR)

(72) Inventor: Young-Soo Jin, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 231 days.

(21) Appl. No.: 14/546,119

(22) Filed: Nov. 18, 2014

(65) Prior Publication Data
US 2015/0308390 A1 Oct. 29, 2015

(30) Foreign Application Priority Data
Apr. 28, 2014 (KR) .................. 10-2014-0050584

(51) Int. Cl.
*F02M 35/10* (2006.01)
*F02B 29/04* (2006.01)
*F02B 43/10* (2006.01)
*F02B 37/16* (2006.01)
*F02M 35/16* (2006.01)
*F02M 35/104* (2006.01)

(52) U.S. Cl.
CPC ....... *F02M 35/10157* (2013.01); *F02B 29/04* (2013.01); *F02B 37/16* (2013.01); *F02B 43/10* (2013.01); *F02M 35/104* (2013.01); *F02M 35/10144* (2013.01); *F02M 35/10255* (2013.01); *F02M 35/10295* (2013.01); *F02M 35/16* (2013.01); *F02B 2043/103* (2013.01); *Y02T 10/144* (2013.01); *Y02T 10/146* (2013.01)

(58) Field of Classification Search
CPC .......... F02B 29/04; F02B 37/16; F02B 43/10; F02B 2043/103; F02M 35/10144; F02M 35/10157; F02M 35/10255; F02M 35/10295; F02M 35/104; F02M 35/16; Y02T 10/144; Y02T 10/146
USPC ................................................. 60/602, 605.2
See application file for complete search history.

(56) References Cited

U.S. PATENT DOCUMENTS 4,424,738 A * 1/1984 Leighton ............... F16K 17/044
                                                            137/116.5
5,492,103 A    2/1996 Goto
(Continued)

FOREIGN PATENT DOCUMENTS

JP    59-181376 U    12/1984
JP    63-51978 U      4/1988
(Continued)

*Primary Examiner* — Mark Laurenzi
*Assistant Examiner* — Dapinder Singh
(74) *Attorney, Agent, or Firm* — Morgan, Lewis & Bockius LLP

(57) ABSTRACT

A separation chamber type anti-surge valve may include a valve body formed with a charge air passage inlet and a charge air passage outlet, and a valve cover coupled to the valve body by a fastening member to define an empty inner space between the valve body and the valve cover, in which the inner space is divided into a diaphragm chamber and a bypass chamber by a valve guide, one side tip of a valve rod being fixed in the diaphragm chamber, a valve disc fixed to another side tip of the valve rod, and the diaphragm chamber is divided into a control pressure chamber and a normal static pressure chamber.

14 Claims, 7 Drawing Sheets

(56) References Cited

U.S. PATENT DOCUMENTS

| | | | | |
|---|---|---|---|---|
| 6,422,217 B1* | 7/2002 | Feucht | ................... | F02M 26/05 |
| | | | | 123/568.11 |
| 6,722,128 B1* | 4/2004 | Adrian | ................... | F02B 37/12 |
| | | | | 123/564 |
| 6,863,260 B2* | 3/2005 | Medina | ................ | F15B 11/036 |
| | | | | 251/310 |
| 9,068,535 B2* | 6/2015 | Graichen | ........... | F02M 25/0709 |
| 9,291,094 B2* | 3/2016 | Graichen | ............ | F16K 31/0648 |
| 2013/0340428 A1* | 12/2013 | Graichen | ........... | F02M 25/0709 |
| | | | | 60/605.2 |
| 2014/0096841 A1* | 4/2014 | Im | ............................ | F16K 7/17 |
| | | | | 137/315.01 |
| 2014/0124055 A1* | 5/2014 | Fontaine | ................ | F16K 47/04 |
| | | | | 137/377 |
| 2014/0166130 A1* | 6/2014 | Jin | ................... | F02M 35/10236 |
| | | | | 137/488 |

FOREIGN PATENT DOCUMENTS

| | | | |
|---|---|---|---|
| JP | 3-121265 A | 5/1991 | |
| JP | 7-225618 A | 8/1995 | |
| KR | 10-2003-0005469 A | 1/2003 | |
| KR | 10-0395008 B1 | 8/2003 | |

* cited by examiner

PARTIAL PERSPECTIVE VIEW
WHEN VIEWED FROM DIRECTION A

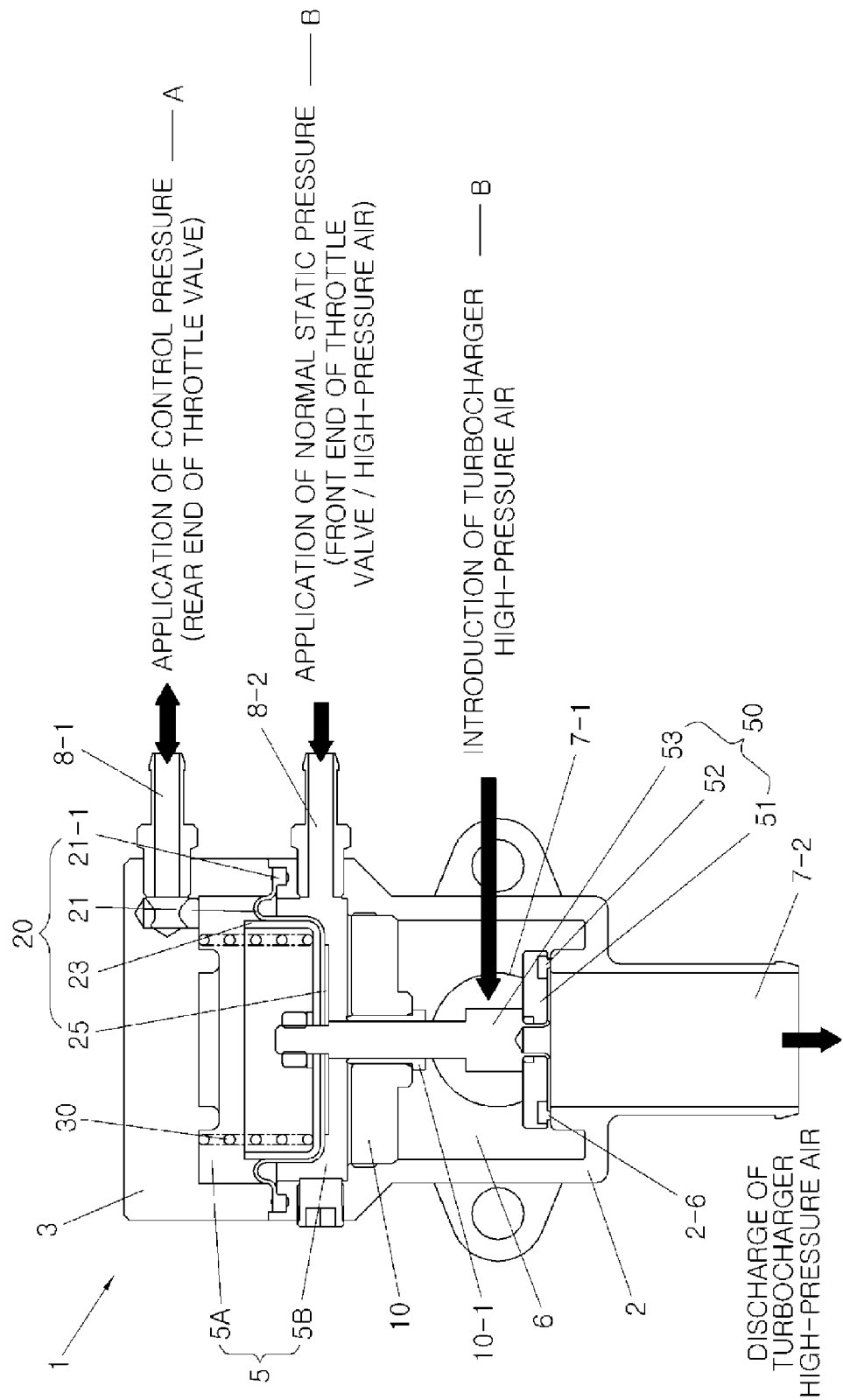

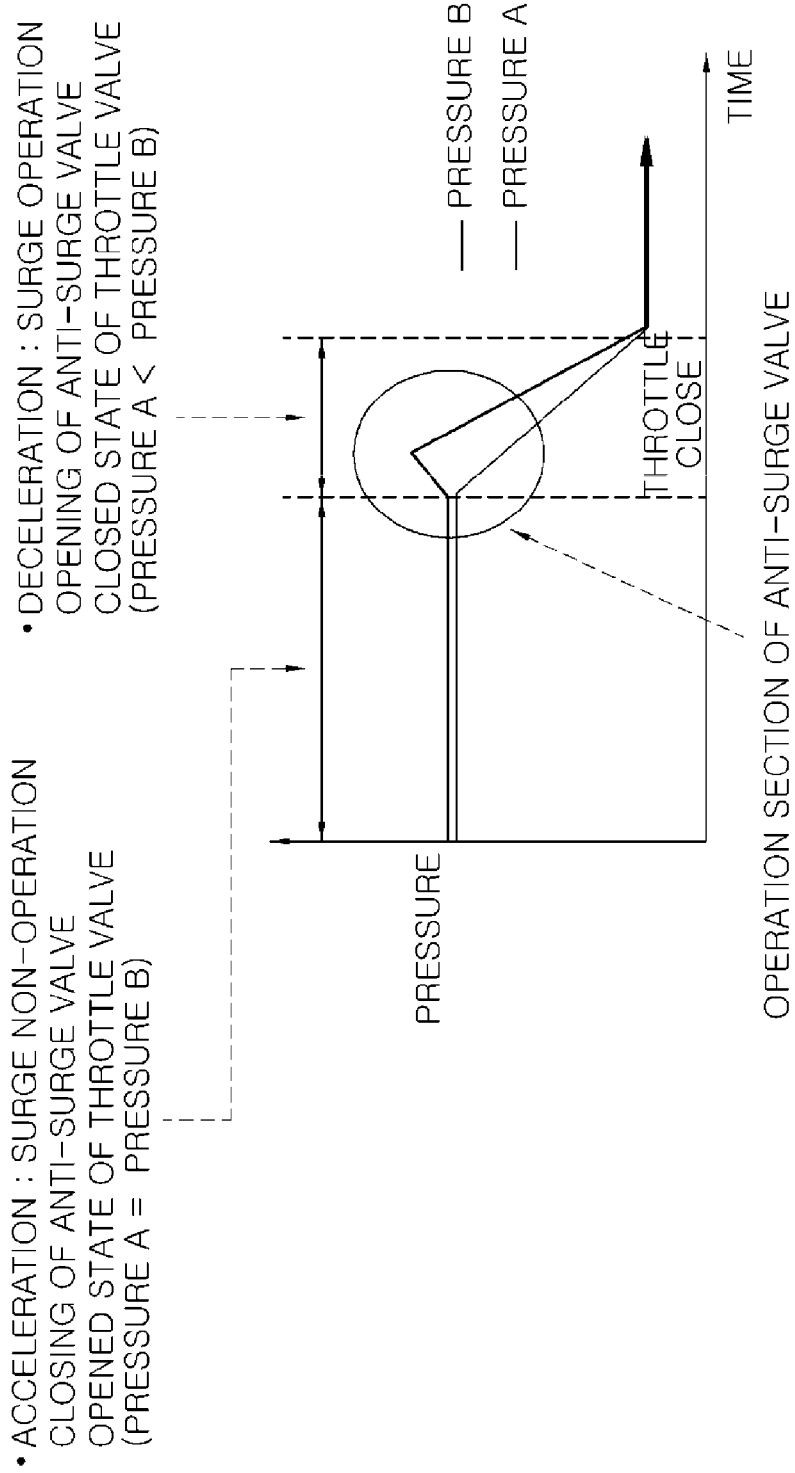

SEPARATION CHAMBER TYPE ANTI-SURGE VALVE AND COMMERCIAL VEHICLE TURBOCHARGER SYSTEM APPLYING THE SAME

CROSS-REFERENCE TO RELATED APPLICATIONS

The present application claims priority to Korean Patent Application No. 10-2014-0050584, filed Apr. 28, 2014, the entire contents of which is incorporated herein for all purposes by this reference.

BACKGROUND OF THE INVENTION

Field of the Invention

Various embodiments of the present invention relate to an anti-surge valve, and particularly, to a commercial vehicle turbocharger system in which an anti-surge valve is realized so as not to be adversely affected by high-temperature and high-pressure charge air, which is introduced thereinto, containing blow-by oil mist by means of double separation of a chamber having an increased vertical height, and to which a separation chamber type anti-surge valve is applied so that surge noise is significantly reduced and the turbocharger system is operable while securing durability.

Description of Related Art

In general, a turbocharger applied to a commercial CNG (Compressed Natural Gas) vehicle is affected by surge noise caused when pulsation, which is generated by a throttle valve being closed when an accelerator pedal is turned off after acceleration, occurs in a supercharging portion of the turbocharger.

For this reason, an anti-surge valve is applied to the commercial CNG vehicle together with the turbocharger so as to reduce surge noise so that durability of the turbocharger is prevented from being deteriorated.

For example, the anti-surge valve reduces surge noise in such a manner that a negative pressure of an intake manifold (at a rear end of the throttle valve, approximately 1.18 bar) generated by closure of the throttle valve acts on the anti-surge valve such that an outlet thereof is opened and a turbocharger side high pressure (at a front end of the throttle valve, approximately 1.22 bar) is released to a duct through the opened outlet. To this end, the anti-surge valve includes a rubber diaphragm, a diaphragm operation portion which is integrally formed with the throttle valve and is opened and closed by a pressure differential at the front and rear of the throttle valve, and an air flow portion.

As such, the anti-surge valve reduces surge noise so that durability of the turbocharger may be secured.

However, the rubber diaphragm of the anti-surge valve may be exposed to turbocharger charge air of high-temperature and high-pressure when opened and closed by the pressure differential at the front and rear of the throttle valve. Particularly, since the rubber diaphragm comes into direct contact with blow-by oil mist contained in the turbocharger charge air of high-temperature and high-pressure, durability of the rubber diaphragm may be deteriorated.

The durability deterioration of the rubber diaphragm brings about tearing of the rubber diaphragm and the anti-surge valve is integrally formed with the diaphragm to thereby generate eccentricity during movement of the diaphragm operation portion and air flow portion connected to the diaphragm. Accordingly, this causes that the anti-surge valve is difficult to operate normally.

Furthermore, the abnormal operation of the anti-surge valve brings about an engine hesitation phenomenon in which a vehicle lurches when a pressure introduced into the rear end of the throttle valve is supplied to an engine in a deceleration section, and a power shortage phenomenon generated when a flow rate of air supplied to the engine is decreased by releasing of an intake line pressure to the front end of the turbocharger during acceleration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a separation chamber type anti-surge valve capable of preventing durability deterioration of a rubber diaphragm by blocking turbocharger charge air of high-temperature and high-pressure containing blow-by oil mist from coming into direct contact with the rubber diaphragm by means of a separation chamber, and achieving prevention of eccentricity generation and an improvement in inside airtightness by guiding movement of a diaphragm connection portion when the anti-surge valve is opened by a pressure differential at the front and rear of a throttle valve by means of a valve guide.

Various aspects of the present invention are directed to providing a commercial vehicle turbocharger system to which a separation chamber type anti-surge valve, capable of achieving prevention of durability deterioration of a rubber diaphragm, prevention of eccentricity generation, and an improvement in inside airtightness, is applied to significantly reduce surge noise. Particularly, the commercial vehicle turbocharger system is capable of preventing an engine hesitation phenomenon in which a vehicle lurches in a deceleration section and a power shortage phenomenon generated when a flow rate of air is decreased during acceleration.

According to various aspects of the present invention, a separation chamber type anti-surge valve includes a valve body formed with a charge air passage inlet through which charge air defined by compression of air is introduced and a charge air passage outlet through which the charge air is discharged, and a valve cover coupled to the valve body by a fastening member to define an empty inner space between the valve body and the valve cover, in which the inner space is divided into a diaphragm chamber and a bypass chamber by a valve guide located at the valve body, a diaphragm being located in the diaphragm chamber, one side tip of a valve rod being fixed in the diaphragm chamber so that the valve rod is operationally moved along with movement of the diaphragm chamber, a valve disc fixed to another side tip of the valve rod being located in the bypass chamber, and the diaphragm chamber is divided into a control pressure chamber in which a suction pressure defined as a negative pressure, equal to or less than atmospheric pressure, by the charge air is provided in a space above the diaphragm so that the diaphragm is pulled, and a normal static pressure chamber in which a static pressure greater than the negative pressure is provided between a space beneath the diaphragm and a space above the valve guide.

The control pressure chamber and the normal static pressure chamber may be formed using inner spaces of the valve body and the valve cover, the bypass chamber may be formed using the inner space of the valve body, the charge air passage inlet may communicate with the charge air passage outlet through the bypass chamber, and the charge air passage inlet and the charge air passage outlet may have a phase difference of 90 degrees relative to each other.

The valve guide may be located at a position stepped portion forming a stepped surface on an inner wall of the valve body.

The diaphragm may be made of a rubber material, and may have an edge protrusion formed at an edge thereof such that the edge protrusion is fitted between adhered surfaces of the valve body and the valve cover.

A reinforced fabric may be attached on one side surface of the diaphragm.

One side surface of the diaphragm may be provided with a diaphragm cup through which the valve rod passes such that the valve rod is fastened by a flange nut, and another side surface of the diaphragm may be provided with a diaphragm plate through which the valve rod passes.

The control pressure chamber may be connected with a control pressure passage nipple for provision of the negative pressure, and the normal static pressure chamber may be connected with a normal static pressure passage nipple for provision of the static pressure.

The valve guide may be provided with a guide bush through which the valve rod passes.

A lower surface of the valve disc may be provided with a valve seat adhered to a valve seat seating surface formed at an inlet surface of the charge air passage outlet, and the valve seat and the valve disc may be fixed to the valve rod by a rivet.

The valve disc may be further provided with an O-ring, and the O-ring may be fitted into the valve disc to surround the valve rod.

The valve body may include a body flange through which the fastening member passes, a body nipple hole connected with a normal static pressure passage nipple for provision of the static pressure to the normal static pressure chamber, an airtight groove recessed at an edge of the body flange such that an edge of the diaphragm is fitted into the airtight groove, a position stepped portion forming a stepped surface on an inner wall of the inner space such that the valve guide is located at the position stepped portion, and a valve seat seating surface formed at an inlet surface of the charge air passage outlet to come into contact with the valve disc.

The valve body may be further formed with a plug hole communicating with the inner space at a portion opposite to the body nipple hole such that a plug is fitted into the plug hole.

The valve cover may include a cover flange through which the fastening member passes, a cover nipple hole connected with a control pressure passage nipple for provision of the negative pressure to the control pressure chamber, and a spring boss on which a control spring for elastically supporting the diaphragm is seated.

The fastening member may be configured of at least four fastening members, and each of the at least four fastening members may evenly fasten the valve body and the valve cover.

According to various aspects of the present invention, a commercial vehicle turbocharger system may include an anti-surge valve including a valve guide dividing an inner space defined by a valve body and a valve cover coupled to each other into a diaphragm chamber and a bypass chamber, a diaphragm assembly moved by a negative pressure in the diaphragm chamber, a valve assembly passing through the valve guide to be fixed to the diaphragm assembly such that the bypass chamber is opened by movement of the valve assembly along with movement of the diaphragm assembly, a charge air passage inlet communicating with the bypass chamber, a charge air passage outlet communicating with the bypass chamber, a control pressure passage nipple communicating with the diaphragm chamber, and a normal static pressure passage nipple communicating with the diaphragm chamber, a turbocharger including a turbine rotated by exhaust gas emitted from an engine through an exhaust manifold, and a compressor compressing air introduced into an air duct so that the air is defined as charge air; an intake manifold through which charge air cooled by an intercooler is supplied to the engine, the intake manifold including a throttle valve for changing a flow rate of the charge air, the charge air at a front end portion of the throttle valve being transferred to each of the bypass chamber and normal static pressure chamber of the anti-surge valve through the intake manifold, a pressure by the charge air at a rear end portion of the throttle valve being transferred to the control pressure chamber of the anti-surge valve through the intake manifold, and a bypass line connected to the anti-surge valve, the charge air discharged from the anti-surge valve being returned back (feedback) to the compressor of the turbocharger via the bypass line.

A position from which the charge air is transferred to the normal static pressure chamber may be a position closer to the throttle valve than a position from which the charge air is transferred to the bypass chamber.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a view illustrating an operation state of the exemplary separation chamber type anti-surge valve according to the present invention.

FIG. 7 is an operation chart of a diaphragm in the exemplary separation chamber type anti-surge valve according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
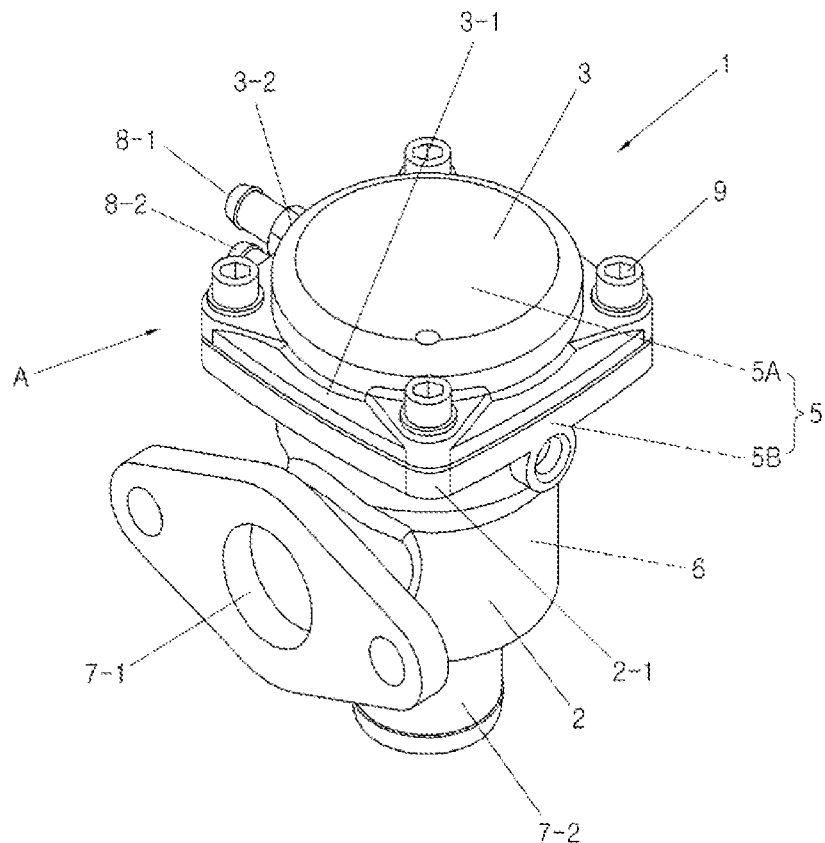
FIG. 1A and FIG. 1B are views illustrating a configuration of an exemplary separation chamber type anti-surge valve according to the present invention.
Figure 1B:
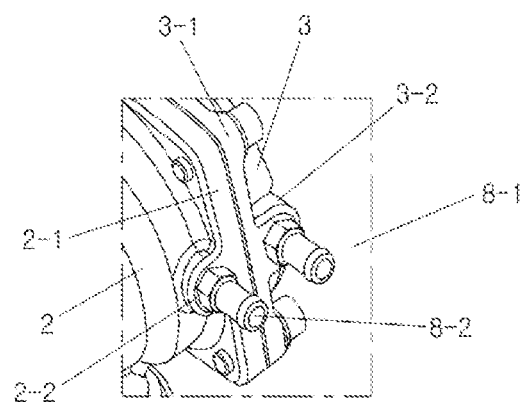
Figure 2:
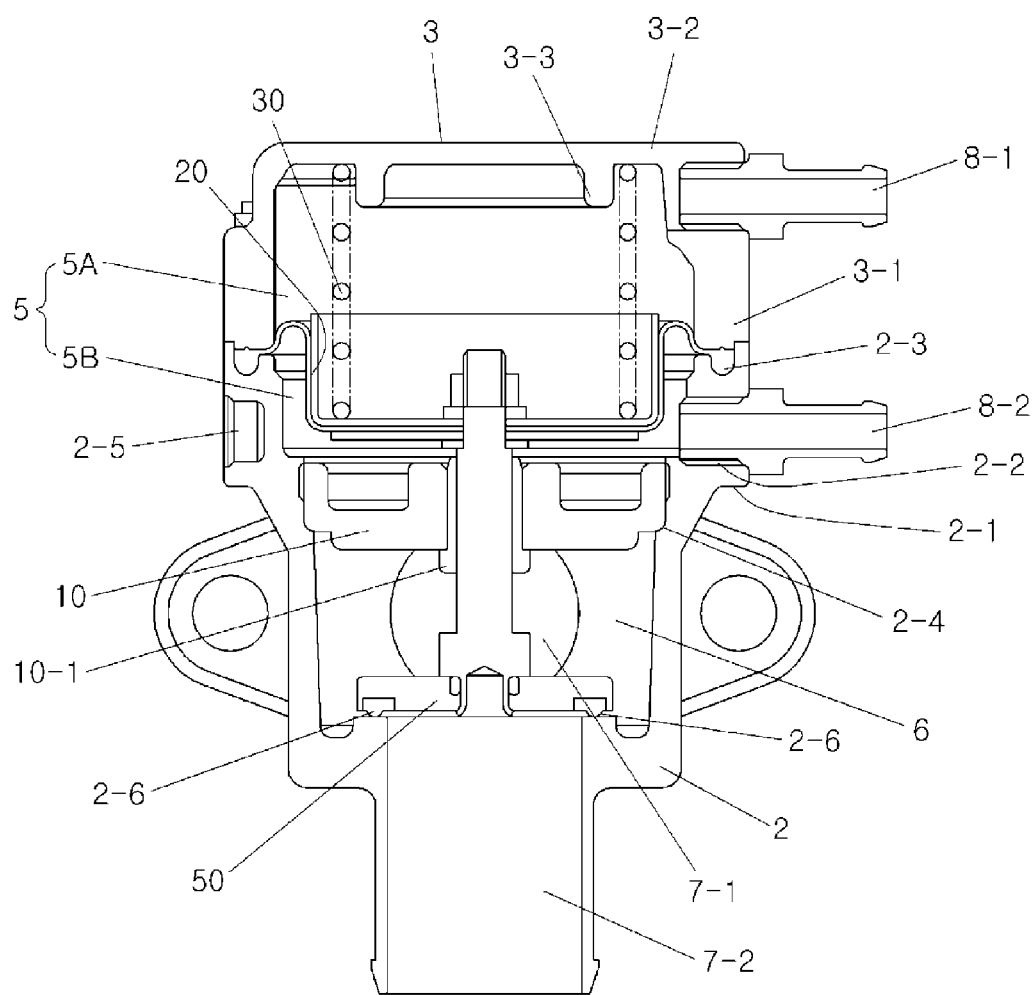
FIG. 2 is a cross-sectional view illustrating the configuration of the exemplary separation chamber type anti-surge valve according to the present invention.

FIG. 1A and FIG. 1B are perspective views illustrating a separation chamber type anti-surge valve according to various embodiments of the present invention. FIG. 2 is a cross-sectional view of the separation chamber type anti-surge valve.

As shown in the drawings, a separation chamber type anti-surge valve 1 includes a valve body 2, a valve cover 3, fastening members 9, a valve guide 10, a diaphragm assembly 20, a control spring 30, a plug 40, and a valve assembly 50.

Specifically, the valve body 2 has an inner space opened at an upper portion thereof on the basis of an axially vertical cross-section. A charge air passage inlet 7-1 of charge air passage portions 7-1 and 7-2 and a normal static pressure passage nipple 8-2 of pressure formation passage portions 8-1 and 8-2 each communicate with the inner space through a side surface of the valve body 2. A charge air passage outlet 7-2 of the charge air passage portions 7-1 and 7-2 is disposed at a position of 90 degrees relative to the charge air passage inlet 7-1 and communicates with the inner space through a lower surface of the valve body 2.

Particularly, the valve body 2 may be made of an ALDC material and have heat resistance of approximately 180° C. and tensile strength of approximately 280 MPa.

Moreover, the valve body 2 further includes a body flange 2-1 which has a greater size than a horizontal cross-section of the valve body 2 and is formed on an upper surface of the valve body 2, a body nipple hole 2-2 formed on one side surface of the valve body 2 to communicate with the inner space, an airtight groove 2-3 recessed at an edge of the body flange 2-1, a position stepped portion 2-4 formed on an inner wall forming the inner space in a stepped cross-section shape, a plug hole 2-5 formed on the other side surface of the valve body 2, and a valve seat seating surface 2-6 which protrudes from a bottom surface of the inner space to be formed at an inlet surface of the charge air passage outlet 7-2 of the charge air passage portions 7-1 and 7-2.

A cover flange 3-1 of the valve cover 3 is adhered to the body flange 2-1, and the fastening members 9 pass through fastening holes of the cover flange 3-1 to be coupled to fastening holes formed at corners of the body flange 2-1. The body flange 2-1 has a rectangular shape and the fastening holes formed at the respective corners. A normal static pressure passage nipple 8-2 of the pressure formation passage portions 8-1 and 8-2 is connected to the body nipple hole 2-2. A diaphragm 21 of the diaphragm assembly 20 is fitted into the airtight groove 2-3, and seals a gap between the body flange 2-1 of the valve body 2 and the cover flange 3-1 of the valve cover 3 which are adhered to each other. The valve guide 10 is seated on the position stepped portion 2-4, thereby allowing the inner space to be divided into a diaphragm chamber 5 and a bypass chamber 6. The plug 40 is fitted into the plug hole 2-5. A valve seat 52 of the valve assembly 50 is adhered to or separated from the valve seat seating surface 2-6 so that the charge air passage outlet 7-2 of the charge air passage portions 7-1 and 7-2 is opened or closed.

Specifically, the valve cover 3 has an inner space opened at a lower portion thereof on the basis of an axially vertical cross-section. A control pressure passage nipple 8-1 of the pressure formation passage portions 8-1 and 8-2 communicate with the inner space through a side surface of the valve cover 3.

Particularly, the valve cover 3 may be made of an ALDC material and have heat resistance of approximately 180° C. and tensile strength of approximately 280 MPa.

Moreover, the valve cover 3 further includes a cover flange 3-1 which has a greater size than a horizontal cross-section of the valve cover 3 and is formed on a lower surface of the valve cover 3, a cover nipple hole 3-2 penetrated from an upper portion of the valve cover 3 to the side surface thereof, and a spring boss 3-3 protruding toward the inner space from the top thereof.

The body flange 2-1 of the valve body 2 is adhered to the cover flange 3-1, and the fastening members 9 pass through the fastening holes of the cover flange 3-1 to be coupled to the fastening holes formed at the corners of the body flange 2-1. The cover flange 3-1 has a rectangular shape and the fastening holes formed at the respective corners. The control pressure passage nipple 8-1 of the pressure formation passage portions 8-1 and 8-2 is connected to the cover nipple hole 3-2 communicating with the inner space. One side of the control spring 30 is seated on the spring boss 3-3.

Each of the fastening members 9 is a bolt or a screw, and at least four fastening members 9 fasten the cover flange 3-1 of the valve cover 3 to the body flange 2-1 of the valve body 2.

Therefore, an inner space defined by the valve body 2 and the valve cover 3 which are coupled to each other by means of the fastening members 9 is defined as a separation chamber divided into the diaphragm chamber 5 and the bypass chamber 6 by the valve guide 10. The bypass chamber 6 communicates with the charge air passage portions 7-1 and 7-2 through which high-temperature and high-pressure air supercharged by a turbocharger passes. The diaphragm chamber 5 communicates with each of the pressure formation passage portions 8-1 and 8-2 provided with a static pressure (pressure equal to or greater than the atmospheric pressure) and a negative pressure (pressure equal to or less than the atmospheric pressure) which is a suction pressure applied to the diaphragm 21 of the diaphragm assembly 20 for opening and closing the valve assembly 50.

The valve guide 10 includes a guide bush 10-1 which surrounds a valve rod 53 of the valve assembly 50 while the valve rod 53 passes through the guide bush 10-1. Thus, eccentricity of the valve assembly 50 generated when the valve rod 53 is moved by the diaphragm 21 of the diaphragm assembly 20 may be removed.

The diaphragm assembly 20 includes a diaphragm 21, a diaphragm cup 23, and a diaphragm plate 25 which are integrally formed with each other, and is fixed to the valve rod 53 of the valve assembly 50. Particularly, the diaphragm assembly 20 moves when the diaphragm 21 receives the suction pressure defined by the pressure formation passage portions 8-1 and 8-2.

The control spring 30 provides elastic restoring force for returning the diaphragm assembly 20 to an initial position, and is a coil spring type.

The plug 40 serves to block the plug hole 2-5 which is formed on the side surface of the valve body 2 and communicates with the inner space.

The valve assembly 50 includes a valve disc 51, a valve seat 52, and a valve rod 53, and is together moved by the valve rod 53 when the diaphragm 21 is moved by the suction pressure so that the charge air passage outlet 7-2 of the charge air passage portions 7-1 and 7-2 is opened.

Figure 3:
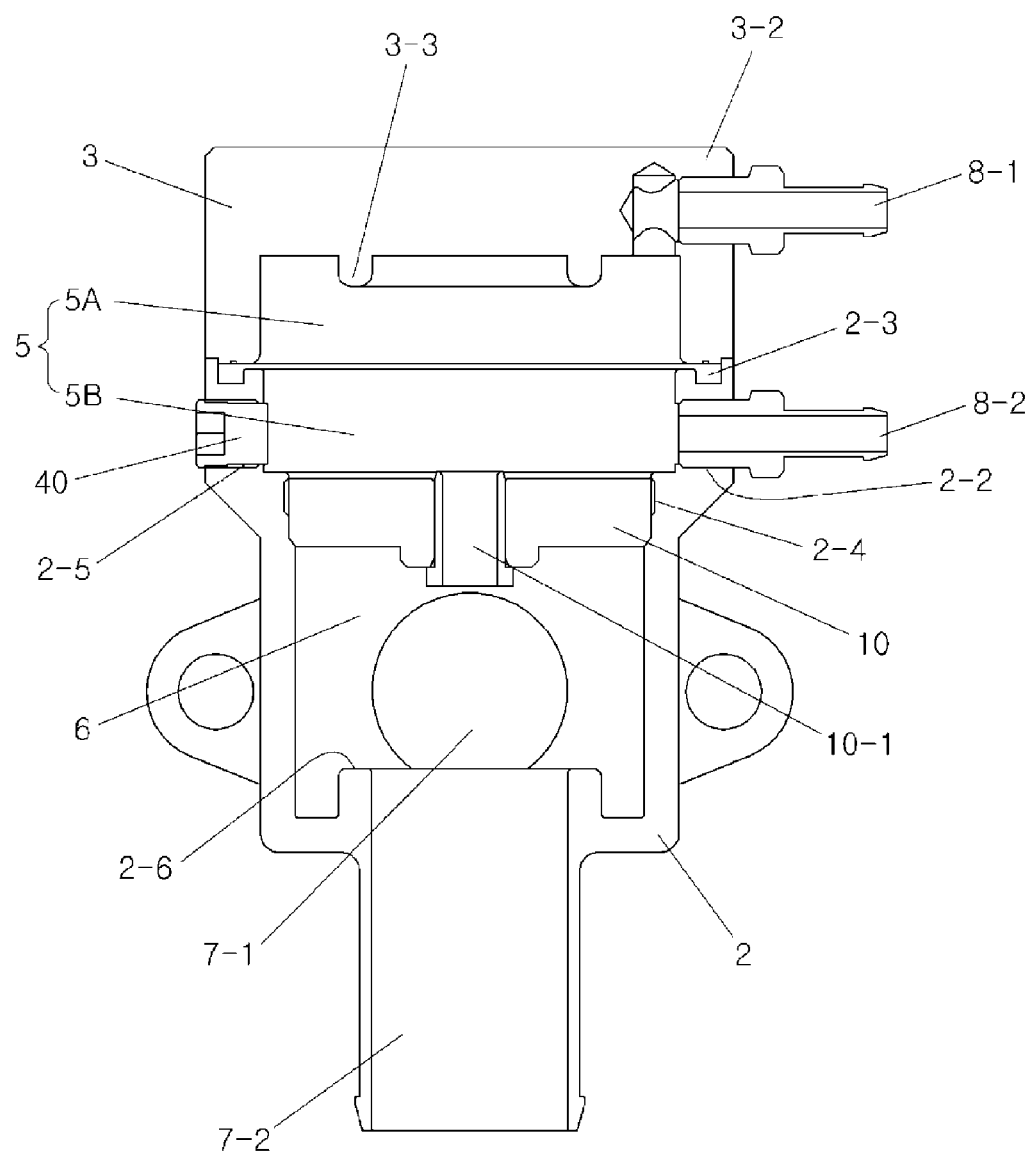
FIG. 3, FIG. 4A and FIG. 4B are views respectively illustrating detailed configurations of a separation chamber divided into a diaphragm chamber and a bypass chamber, a diaphragm assembly, and a valve assembly according to the embodiment of the present invention.
Figure 4A:
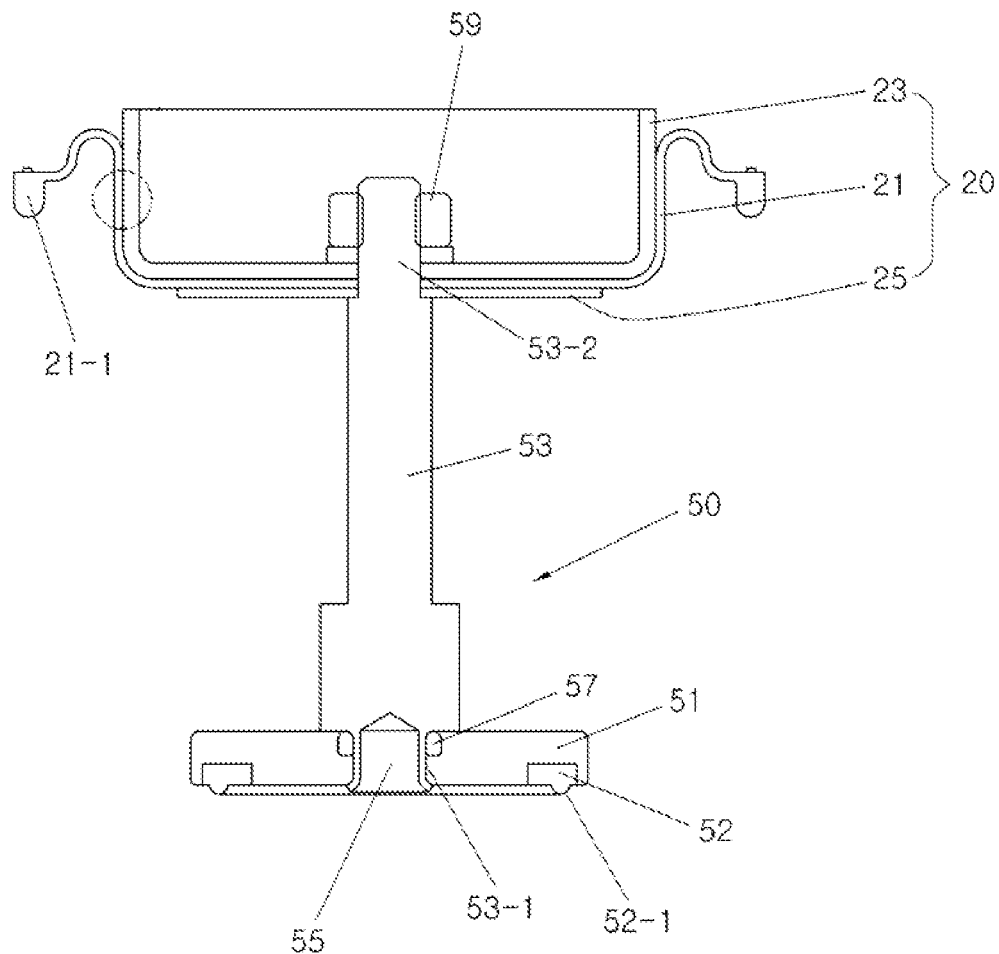
Figure 4B:
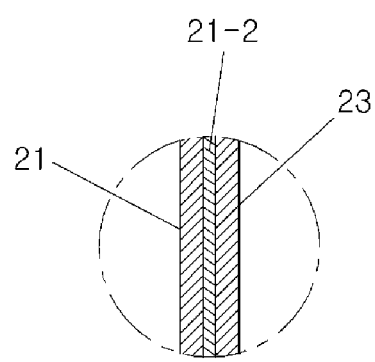

Meanwhile, FIG. 3, FIG. 4A and FIG. 4B are views respectively illustrating detailed configurations of the separation chamber divided into the diaphragm chamber 5 and the bypass chamber 6, the diaphragm assembly 20, and the valve assembly 50 according to various embodiments of the present invention.

As shown in FIG. 3, the diaphragm chamber 5 and the bypass chamber 6 are divided by the valve guide 10 located at the position stepped portion 2-4 of the valve body 2. The diaphragm chamber 5 is formed above the valve guide 10 and the bypass chamber 6 is formed beneath the valve guide 10.

Specifically, the diaphragm chamber 5 is divided into a control pressure chamber 5A communicating with the cover nipple hole 3-2 which protrudes from the upper portion of the valve cover 3 to the side surface thereof, and a normal static pressure chamber 5B communicating with the nipple hole 2-2 formed on the side surface of the valve body 2. The control pressure chamber 5A is provided with the suction pressure which is the negative pressure (pressure equal to or less than the atmospheric pressure) defined by the control pressure passage nipple 8-1 connected to the cover nipple hole 3-2, whereas the normal static pressure chamber 5B is provided with the static pressure (pressure equal to or greater than the atmospheric pressure) defined by the normal static pressure passage nipple 8-2 connected to the nipple hole 2-2. Therefore, the control pressure chamber 5A and the normal static pressure chamber 5B form one space through which the control pressure chamber 5A is connected to the normal static pressure chamber 5B. The negative pressure is applied to the upper portion of the diaphragm assembly 20 located in the space whereas the static pressure is applied to the lower portion of the diaphragm assembly 20.

Specifically, high-temperature and high-pressure air supercharged by the turbocharger is introduced into the bypass chamber 6 through the charge air passage inlet 7-1 and the introduced high-temperature and high-pressure air is discharged from the anti-surge valve 1 through the charge air passage outlet 7-2.

As shown in FIG. 4A and FIG. 4B, the diaphragm assembly 20 is integrally configured of the diaphragm 21, the diaphragm cup 23 located inside the diaphragm 21, and the diaphragm plate 25 outside the diaphragm 21, and the valve rod 53 of the valve assembly 50 passes through the diaphragm assembly 20 and is fixed by a flange nut 59 in a space inside the diaphragm cup 23.

Specifically, the diaphragm 21 may be made of a rubber material of FVMQ (hardness: 50) and is formed in an opened cup shape having a thickness of approximately 0.8 t. Particularly, the diaphragm 21 has an edge protrusion 21-1 formed at an edge thereof, and the edge protrusion 21-1 is fitted into the airtight groove 2-3. Therefore, the diaphragm 21 seals a gap between the body flange 2-1 of the valve body 2 and the cover flange 3-1 of the valve cover 3 which are adhered to each other while moving the valve assembly 50. In addition, since a reinforced fabric 21-2 which may be made of an ARAMID material is attached on an inside space surface of the diaphragm 21, durability of the diaphragm 21 may be significantly increased without a change in cross-section of the diaphragm 21.

The diaphragm cup 23 and the diaphragm plate 25 may each be made of a steel material.

The valve assembly is integrally configured of the valve disc 51 which opens and closes the charge air passage outlet 7-2, the valve seat 52 provided on a lower surface of the valve disc 51 to be adhered to an inlet of the charge air passage outlet 7-2, the valve rod 53 fixed to the diaphragm assembly 20 by the flange nut 59 while being fixed to the valve disc 51 by a rivet 55, and an O-ring 57 fitted into a fastening portion of the valve disc 51 and the valve rod 53.

Specifically, the lower surface of the valve disc 51 is formed with a stepped surface such that the valve seat 52 is stably adhered to the lower surface of the valve disc 51, and the valve disc 51 is made of a metal material. The valve seat 52 is made of a rubber material and is adhered to the stepped surface of the valve disc 51. Particularly, the valve seat 52 is adhered to the valve seat seating surface 2-6 formed at the inlet surface of the charge air passage outlet 7-2 by an annular contact protrusion 52-1 formed in a concentric shape. The valve rod 53 has a rod shape. The valve rod 53 has a valve stationary portion 53-1 formed at one side tip thereof so as to be supported by the valve stationary portion 53-1 passing through the valve disc 51 and the valve seat 52, and a diaphragm stationary portion 53-2 formed at the other side tip thereof so as to be fastened by the flange nut 57 through the diaphragm stationary portion 53-2 in the inside space of the diaphragm cup 23 through which the valve rod 53 passes. The rivet 55 is fastened by the valve stationary portion 53-1 of the valve rod 53 so as to integrally form the valve disc 51 with the valve seat 52 and establish fixation force. The O-ring 57 is fitted into a hole of the valve disc 51 through which the valve stationary portion 53-1 passes in a state of surrounding the valve stationary portion 53-1 of the valve rod 53.

Figure 5:
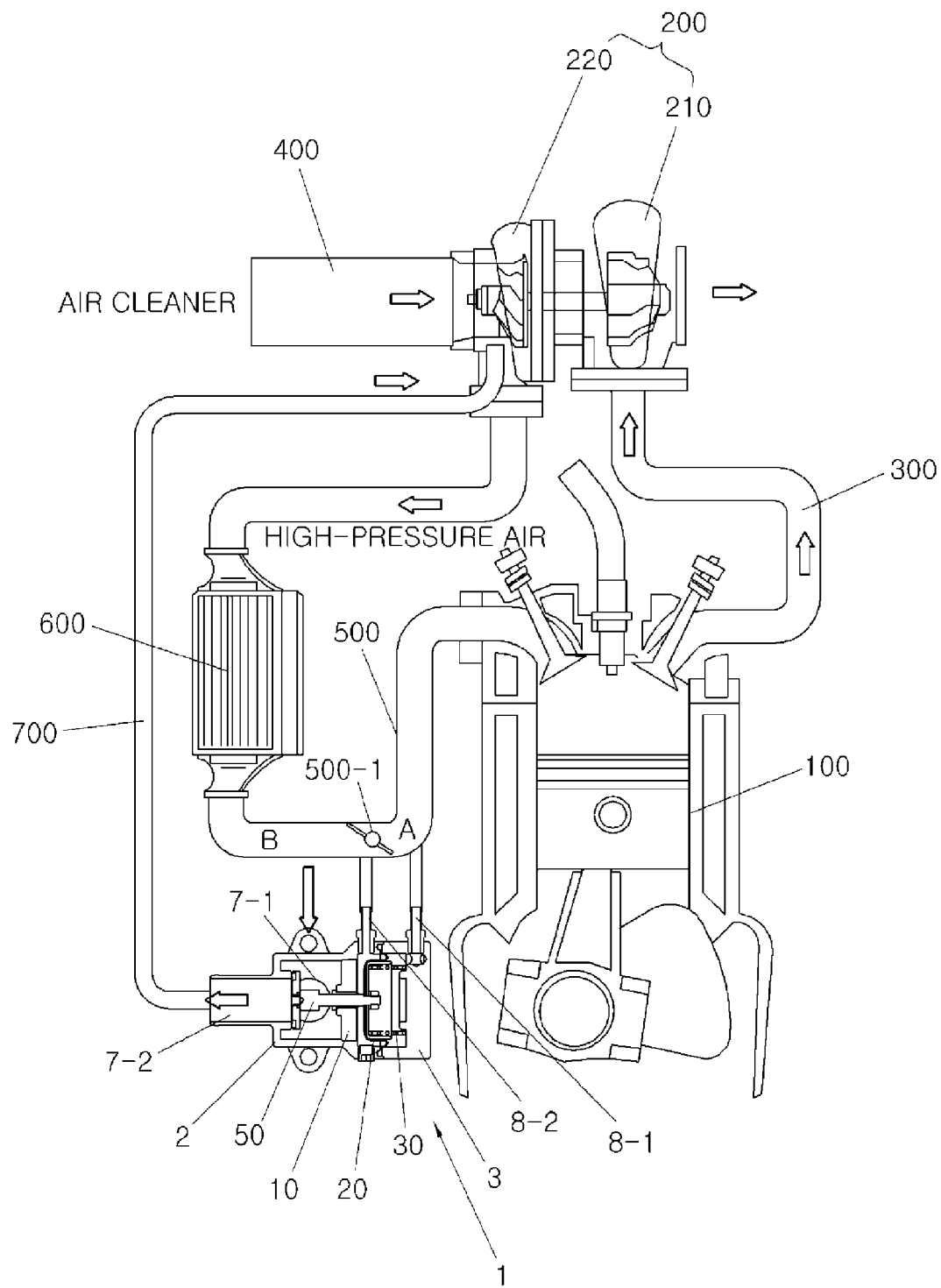
FIG. 5 is a view illustrating a configuration of a commercial vehicle turbocharger system to which the exemplary separation chamber type anti-surge valve according to the present invention is applied.

Meanwhile, FIG. 5 is a view illustrating a configuration of a commercial vehicle turbocharger system to which the separation chamber type anti-surge valve according to various embodiments of the present invention is applied.

As shown in the drawing, the commercial vehicle turbocharger system includes an anti-surge valve 1, a turbocharger 200, an exhaust manifold 300 connected from an engine 100 to a turbine 210 of the turbocharger 200, an intake manifold 500 connected from a compressor 220 of the turbocharger 200 to the engine 100, an intercooler 600 installed on a charge air path connected to the intake manifold 500, and a bypass line 700 connected from the anti-surge valve 1 to the compressor 220 of the turbocharger 200.

The anti-surge valve 1 includes a valve guide 10 which divides an inner space defined by a valve body 2 and the valve cover 3 fastened to each other by fastening members 9 into a diaphragm chamber 5 and a bypass chamber 6, a valve assembly 20 moved by a negative pressure (pressure equal to or less than the atmospheric pressure) provided in the diaphragm chamber 5, a valve assembly 50 which passes through the valve guide 10 and is fixed to the diaphragm assembly 20 such that the bypass chamber 6 is opened by movement of the valve assembly 50 along with movement of the diaphragm assembly 20, a charge air passage inlet 7-1 communicating with the bypass chamber 6, a charge air passage outlet 7-2 communicating with the bypass chamber 6, a control pressure passage nipple 8-1 communicating with the diaphragm chamber 5, and a normal static pressure passage nipple 8-2 communicating with the diaphragm chamber 5. Accordingly, the anti-surge valve 1 has the same configuration and operation as the separation chamber type anti-surge valve described through FIG. 1A, FIG. 1B, FIG. 2, FIG. 3, FIG. 4A and FIG. 4B.

The turbine 210 of the turbocharger 200 is rotated by exhaust gas emitted from the engine 100 through the exhaust manifold 300, and the compressor 220 of the turbocharger 200 compresses air introduced into an air duct 400 so that the air is defined as charge air. The intercooler 600 cools charge air discharged from the turbocharger 200 so as to lower the temperature of the charge air.

The intake manifold 500 is provided with a throttle valve 500-1. The charge air passage inlet 7-1 and normal static pressure passage nipple 8-2 of the anti-surge valve 1 are each connected to a front portion of the throttle valve 500-1, and the control pressure passage nipple 8-1 of the anti-surge valve 1 is connected to a rear portion of the throttle valve 500-1. In this case, the normal static pressure passage nipple 8-2 is located at a position closer to the throttle valve 500-1 than the charge air passage inlet 7-1 to be spaced apart from the charge air passage inlet 7-1.

Since the bypass line 700 is connected to the charge air passage outlet 7-2 of the anti-surge valve 1, high-temperature and high-pressure charge air discharged from the intake manifold 500 through the front end of the throttle valve 500-1 is returned back (feedback) to the compressor 220 of the turbocharger 200.

Meanwhile, FIG. 6 is a view illustrating an operation state of the anti-surge valve 1. FIG. 7 is an operation chart of the diaphragm of the anti-surge valve 1.

As shown in the drawings, a throttle valve rear end pressure A of the intake manifold 500 applied to the rear end of the throttle valve acts on the control pressure chamber 5A of the anti-surge valve 1, and a throttle valve front end pressure B of the intake manifold 500 applied to the front end of the throttle valve acts on the normal static pressure chamber 5B of the anti-surge valve 1. In addition, the throttle valve front end pressure B of the intake manifold 500 applied to the front end of the throttle valve acts on the bypass chamber 6 of the anti-surge valve 1.

When acceleration is performed in the above state, the throttle valve rear end pressure A is increased relative to the throttle valve front end pressure B as an opening degree of the throttle valve 500-1 is increased. Thus, a pressure in the control pressure chamber 5A of the anti-surge valve 1 is relatively greater than a pressure in the normal static pressure chamber 5B, thereby enabling the diaphragm 21 to be pushed out toward the bypass chamber 6 of the anti-surge valve 1. Consequently, the valve seat 52 of the valve disc 51 is maintained in a state of being adhered to the valve seat seating surface 2-6 formed at the inlet surface of the charge air passage outlet 7-2.

As a result, the anti-surge valve 1 is maintained in a closed state.

On the other hand, when deceleration is performed in the above state, the throttle valve rear end pressure A is decreased relative to the throttle valve front end pressure B as the opening degree of the throttle valve 500-1 is decreased. Thus, the pressure in the control pressure chamber 5A of the anti-surge valve 1 is relatively less than the pressure in the normal static pressure chamber 5B, thereby allowing the control pressure chamber 5A to be provided with a suction pressure for pulling the diaphragm 21.

Then, the diaphragm 21 is pulled so as to be away from the bypass chamber 6 of the anti-surge valve 1. Consequently, the valve rod 53 fixed to the diaphragm cup 23 is pulled along with the pulling of the diaphragm 21 so that the valve disc 51 fixed to the valve rod 53 is together moved in a movement direction of the valve rod 53. In this case, since the valve rod 53 is stably moved with no eccentricity through the guide bush 10-1 of the valve guide 10, no local load by eccentricity of the valve rod 53 is additionally applied to the diaphragm 21.

As a result, the valve seat 52 provided at the valve disc 51 is separated from the valve seat seating surface 2-6 formed at the inlet surface of the charge air passage outlet 7-2 so that the charge air passage outlet 7-2 is opened. Accordingly, the anti-surge valve 1 is changed to an opened state.

Therefore, high-temperature and high-pressure charge air in the intake manifold 500 introduced into the bypass chamber 6 through the charge air passage inlet 7-1 of the anti-surge valve 1 is discharged through the opened charge air passage outlet 7-2, and the high-temperature and high-pressure charge air discharged through the opened charge air passage outlet 7-2 is returned back (feedback) to the compressor 220 of the turbocharger 200 via the bypass line 700. Consequently, the anti-surge valve 1 reduces surge noise.

In particular, during the feedback of high-temperature and high-pressure charge air, the diaphragm chamber 5 and the bypass chamber 6 are divided by the valve guide 10 coming into direct contact with high-temperature and high-pressure charge air introduced into the bypass chamber 6. Thus, the diaphragm 21 located in the diaphragm chamber 5 is not adversely affected by blow-by oil mist contained in the high-temperature and high-pressure charge air.

As a result, since durability of the rubber diaphragm 21 is significantly increased, it is experimentally proved that durable reliability of the anti-surge valve is more improved by approximately 70% compared to the related art.

As described above, the separation chamber type anti-surge valve 1 according to various embodiments includes the separation chamber as the inner space, which is defined by the valve body 2 and the valve cover 3 coupled to each other by means of the fastening members 9, divided into the diaphragm chamber 5 and the bypass chamber 6 by the valve guide 10. The diaphragm chamber 5 communicates with each of the pressure formation passage portions 8-1 and 8-2 in which the suction pressure is applied to the diaphragm assembly 20 for opening and closing the valve assembly 50. The bypass chamber 6 communicates with the charge air passage portions 7-1 and 7-2 through which high-temperature and high-pressure charge air, containing blow-by oil mist, discharged from the turbocharger passes.

Consequently, it may be possible to prevent durability of the rubber diaphragm 21 from being deteriorated due to the blow-by oil mist contained in the charge air. In addition, it may be possible to achieve prevention of eccentricity generation and an improvement in inside airtightness by guiding movement of the valve rod 53 when the anti-surge valve is opened by the pressure differential at the front and rear of the throttle valve by means of the valve guide 10. Particularly, surge noise may be significantly reduced since the separation chamber type anti-surge valve 1 is applied to the present invention, and it may be possible to realize commercial vehicle turbocharger system without an engine hesitation phenomenon in which a vehicle lurches in a deceleration section and a power shortage phenomenon generated when a flow rate of air is decreased during acceleration.

As is apparent from the above description, an anti-surge valve according to various embodiments of the present invention may significantly enhance durability of a rubber diaphragm by blocking high-temperature and high-pressure charge air containing blow-by oil mist from coming into direct contact with the rubber diaphragm by means of separation of diaphragm operation chambers from a bypass chamber. Particularly, it may be possible to more improve durable reliability of the anti-surge valve by approximately 70% compared to the related art.

In addition, the anti-surge valve may significantly improve operation accuracy of the diaphragm by a pressure variation between a throttle valve rear end pressure (intake manifold pressure) supplied to the separated diaphragm operation chambers and a throttle valve front end pressure (intercooler rear end pressure) supplied to the bypass chamber.

In addition, the anti-surge valve may achieve prevention of eccentricity generation and an improvement in inside airtightness by guiding movement of a diaphragm connection portion when opened by a pressure differential at the front and rear of a throttle valve by means of a valve guide.

In addition, since a commercial vehicle turbocharger system according to various embodiments of the present invention includes the anti-surge valve having durable reliability which is more improved by approximately 70% compared to the related art, surge noise may be significantly reduced. Particularly, it may be possible to prevent an engine hesitation phenomenon in which a vehicle lurches in a deceleration section and a power shortage phenomenon generated when a flow rate of air is decreased during acceleration.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A separation chamber type anti-surge valve comprising:
   a valve body formed with a charge air passage inlet through which charge air defined by compression of air is introduced and a charge air passage outlet through which the charge air is discharged, and a valve cover coupled to the valve body by a fastener to define an empty inner space between the valve body and the valve cover, wherein:
   the inner space is divided into a diaphragm chamber and a bypass chamber by a valve guide located at the valve body, a diaphragm being located in the diaphragm chamber, a first side tip of a valve rod being fixed in the diaphragm chamber so that the valve rod is operationally moved along with movement of the diaphragm chamber, a valve disc fixed to a second side tip of the valve rod being located in the bypass chamber, and
   the diaphragm chamber is divided into a control pressure chamber in which a suction pressure defined as a negative pressure, equal to or less than atmospheric pressure, by the charge air is provided in a space above the diaphragm so that the diaphragm is pulled, and a normal static pressure chamber in which a static pressure greater than the negative pressure is provided between a space beneath the diaphragm and a space above the valve guide.

2. The separation chamber type anti-surge valve of claim 1, wherein the control pressure chamber and the normal static pressure chamber are formed using inner spaces of the valve body and the valve cover, the bypass chamber is formed using the inner space of the valve body, the charge air passage inlet communicates with the charge air passage outlet through the bypass chamber, and the charge air passage inlet and the charge air passage outlet have a phase difference of 90 degrees relative to each other.

3. The separation chamber type anti-surge valve of claim 1, wherein the valve guide is located at a position stepped portion forming a stepped surface on an inner wall of the valve body.

4. The separation chamber type anti-surge valve of claim 1, wherein the diaphragm is made of a rubber material, and has an edge protrusion formed at an edge thereof such that the edge protrusion is fitted between adhered surfaces of the valve body and the valve cover.

5. The separation chamber type anti-surge valve of claim 4, wherein a reinforced fabric is attached on one side surface of the diaphragm.

6. The separation chamber type anti-surge valve of claim 4, wherein one side surface of the diaphragm is provided with a diaphragm cup through which the valve rod passes such that the valve rod is fastened by a flange nut, and another side surface of the diaphragm is provided with a diaphragm plate through which the valve rod passes.

7. The separation chamber type anti-surge valve of claim 1, wherein the control pressure chamber is connected with a control pressure passage nipple for provision of the negative pressure, and the normal static pressure chamber is connected with a normal static pressure passage nipple for provision of the static pressure.

8. The separation chamber type anti-surge valve of claim 1, wherein the valve guide is provided with a guide bush through which the valve rod passes.

9. The separation chamber type anti-surge valve of claim 1, wherein a lower surface of the valve disc is provided with a valve seat adhered to a valve seat seating surface formed at an inlet surface of the charge air passage outlet, and the valve seat and the valve disc are fixed to the valve rod by a rivet.

10. The separation chamber type anti-surge valve of claim 9, wherein the valve disc is further provided with an O-ring, and the O-ring is fitted into the valve disc to surround the valve rod.

11. The separation chamber type anti-surge valve of claim 1, wherein the valve body comprises:
    a body flange through which the fastener passes;
    a body nipple hole connected with a normal static pressure passage nipple for provision of the static pressure to the normal static pressure chamber;
    an airtight groove recessed at an edge of the body flange such that an edge of the diaphragm is fitted into the airtight groove;
    a position stepped portion forming a stepped surface on an inner wall of the inner space such that the valve guide is located at the position stepped portion; and
    a valve seat seating surface formed at an inlet surface of the charge air passage outlet to come into contact with the valve disc.

12. The separation chamber type anti-surge valve of claim 11, wherein the valve body is further formed with a plug hole communicating with the inner space at a portion opposite to the body nipple hole such that a plug is fitted into the plug hole.

13. The separation chamber type anti-surge valve of claim 1, wherein the valve cover comprises:
   a cover flange through which the fastener passes;
   a cover nipple hole connected with a control pressure passage nipple for provision of the negative pressure to the control pressure chamber; and
   a spring boss on which a control spring for elastically supporting the diaphragm is seated.

14. The separation chamber type anti-surge valve of claim 1, wherein the fastener includes at least four fasteners, and each of the at least four fasteners evenly fastens the valve body and the valve cover.

* * * * *